(12) United States Patent
Sasaki

(10) Patent No.: US 8,224,172 B2
(45) Date of Patent: Jul. 17, 2012

(54) AUTOFOCUS SYSTEM

(75) Inventor: Tadashi Sasaki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 32 days.

(21) Appl. No.: 12/977,868

(22) Filed: Dec. 23, 2010

(65) Prior Publication Data

US 2011/0158624 A1   Jun. 30, 2011

(30) Foreign Application Priority Data

Dec. 25, 2009   (JP) .................................. 2009-295477

(51) Int. Cl.
  *G03B 13/36*   (2006.01)
(52) U.S. Cl. .......................................... 396/95; 396/123
(58) Field of Classification Search .................... 396/95, 396/121–123
  See application file for complete search history.

(56) References Cited

U.S. PATENT DOCUMENTS

| 7,561,790 B2 | 7/2009 | Yata |
| 7,660,518 B2* | 2/2010 | Sasaki ........................... 396/121 |
| 7,962,029 B2* | 6/2011 | Yata ................................. 396/95 |
| 7,978,968 B2* | 7/2011 | Sasaki ............................ 396/121 |
| 2004/0207743 A1 | 10/2004 | Nozaki et al. |
| 2007/0269196 A1* | 11/2007 | Misawa ........................ 396/123 |
| 2011/0158624 A1* | 6/2011 | Sasaki .......................... 396/123 |

FOREIGN PATENT DOCUMENTS

| EP | 1471455 | 10/2004 |
| JP | 2004-320286 | 11/2004 |
| JP | 2006-267221 | 10/2006 |

* cited by examiner

*Primary Examiner* — William B. Perkey
(74) *Attorney, Agent, or Firm* — Young & Thompson

(57) ABSTRACT

An autofocus system includes: a focus operating device which performs focusing in a shooting screen of a camera; a best focus range detecting device which detects a range of a best focus state from the shooting screen representing the result of the focusing performed by the focus operating device; a face detecting device which detects a range of a human face from the shooting screen; an AF frame automatic setting device by which, when a human face exists in the range being in the best focus state in the shooting screen, the position of an AF frame representing the range of an AF area that is the range to be focused by autofocus in the shooting screen, is automatically set to a face frame representing the range of the human face; and an AF frame automatic tracking device which automatically tracks a subject in the set AF frame.

7 Claims, 6 Drawing Sheets

AUTOFOCUS SYSTEM

BACKGROUND OF THE INVENTION

1. Field of the Invention

The presently disclosed subject matter relates to an autofocus system, and more particularly to an autofocus system having a function of enabling a predetermined subject to be automatically tracked by an AF frame (AF area) representing a range of a subject focused by autofocus (AF).

2. Description of the Related Art

Conventionally, in an autofocus (AF) system for automatically setting the focus of a camera, it is necessary to instruct the camera where the focus of the camera is to be set. At this time, in a common camera, and the like, the focusing position is fixed at the center of a shooting range. Thus, the focus of the camera is set to, for example, a person located at the center of the shooting range.

However, in such a case where a moving subject is shot (photographed), it is inconvenient for shooting if the focusing position is fixed in this way. Thus, an autofocus system is known, in which, for example, when a scene of a quickly moving subject in a sporting event, and the like, is shot by a television camera and the like, the AF area (AF frame) of the television camera is configured to automatically track the subject in order that the focus of the camera is set to the subject (see, for example, Japanese Patent Application Laid-Open No. 2006-267221). Note that in this specification, similarly to the AF area, the AF frame representing the contour of the range of the AF area is mainly used as a term which means the range of a subject to be focused.

Further, a digital camera is known, which detects an image representing a human face from an shot image, so as to automatically set the focus of the camera to the face set as the subject, or so as to automatically change the zoom magnification to enlarge the area representing the face in the detected image (see, for example, Japanese Patent Application Laid-Open No. 2004-320286).

SUMMARY OF THE INVENTION

Meanwhile, in an autofocus system having an AF frame auto-tracking function, when the automatic tracking of the AF frame is to be started, an operator needs to specify a subject to be focused, that is, to specify a tracking target subject. For this reason, the operator needs to perform an operation of moving the position of the AF frame in a shooting range (screen) by using an operating apparatus, such as a joystick and a touch panel so as to locate the AF frame at a position of the subject desired to be set as the tracking target. Then, the operator performs an operation of turning on a tracking start switch, and the like, so as to set (define), as a tracking target subject, the subject existing in the range of the present AF frame. In addition, the operator performs an operation of instructing the start of automatic tracking of the AF frame.

However, there is a problem that the manual operation for setting the position of the AF frame to the position of the tracking target subject as described above requires labor and time. Further, there is also a problem that, in a shoulder-held television camera (handy camera) used for news gathering, and the like, it is difficult to install the operating apparatus for operating the AF frame in a position where the operator (cameraman) can easily operate the operating apparatus.

Further, the operator always looks through a view finder to perform camera work. Thus, it is also desired that the automatic tracking of the AF frame can be performed by an operation as simple as possible.

Particularly, in the situation where the person-priority shooting is performed as in a case of a song broadcast, a sports broadcast, and the like, when a plurality of human faces are included in the shooting range, there is a problem that the operator has to perform an operation for selecting, from the plurality of human faces, a human face to be set as the tracking target subject, and thereby a large burden is imposed on the operator.

On the other hand, it is convenient when the AF frame can be automatically set, because the manual operation of the AF frame is troublesome for the operator as described above. However, there is also a problem that it is not easy to automatically set the AF frame to a place intended by the cameraman (operator).

The presently disclosed subject matter has been made in view of the above described circumstances. An object of the presently disclosed subject matter is to provide an autofocus system in which the cameraman's burden is reduced by eliminating the need of the complicated operation at the start of the automatic tracking of the AF frame and by enabling a human face to be set as a tracking target by a simple operation.

To this end, an autofocus system according to a first aspect of the presently disclosed subject matter includes: a focus operating device which performs focusing in a shooting screen of a camera; a best focus range detecting device which detects a range being in a best focus state from the shooting screen representing the result of the focusing performed by the focus operating device; a face detecting device which detects a range including a human face from the shooting screen; an AF frame automatic setting device which, when a human face exists in the range being in the best focus state in the shooting screen, automatically sets a position of an AF frame representing a range of an AF area that is a range to be focused by autofocus in the shooting screen, to a face frame representing the range of the human face; and an AF frame automatic tracking device which automatically tracks a subject in the AF frame set by the AF frame automatic setting device.

According to the presently disclosed subject matter, a cameraman (operator) can make the AF frame automatically set to a range of a human face desired to be set as a tracking target, only by operating the focus operating device, and the AF frame can be made to automatically track the tracking a target subject (that is, the human face) by following the movement of the subject. Thereby, the complicated operation is made unnecessary at the time of starting the automatic tracking of the AF frame, and hence the cameraman's burden can be reduced.

According to a second aspect of the presently disclosed subject matter, in the autofocus system according to the first aspect, a plurality of human faces exist in the range being in the best focus state in the shooting screen, the position of the AF frame is automatically set to the face frame representing the range of one human face selected from the plurality of human faces according to a predetermined priority order.

As the priority order used for selecting one human face from the plurality of human faces, there are various modes, such as a front-focus priority mode (or a rear-focus priority mode), a screen-right-side priority mode (or a screen-left-side priority mode), and a high-luminance priority mode (or a low-luminance priority mode).

According to a third aspect of the presently disclosed subject matter, in the autofocus system according to one of the first and second aspects, when no human face exists in the range being in the best focus state in the shooting screen, the position of the AF frame is automatically set to an object included in the range being in the best focus state.

According to a fourth aspect of the presently disclosed subject matter, in the autofocus system according to one of the first to third aspects, the best focus range detecting device divides the shooting screen into a plurality of regions, and detects the range being in the best focus state by acquiring a focus state of each of the divided regions.

According to a fifth aspect of the presently disclosed subject matter, in the autofocus system according to the fourth aspect, the focus state of each of the divided regions includes a best focus state, a front focus state, and a rear focus state.

According to a sixth aspect of the presently disclosed subject matter, in the autofocus system according to one of the first to fifth aspects, the best focus range detecting device acquires the focus state based on a focus evaluation value of a subject image which is obtained based on an image signal obtained by imaging with an imaging element, subject light separated for the focus state detection from subject light incident on an imaging lens.

According to a seventh aspect of the presently disclosed subject matter, in the autofocus system according to one of the first to sixth aspects, when the focus operating device is again operated after the AF frame automatic setting device automatically set the position of the AF frame, the best focus range detecting device again detects the range being in the best focus state in the shooting screen representing the result of the focusing performed by the focus operating device, and the AF frame automatic setting device again sets the position of the AF frame based on the range being in the best focus state again detected by the best focus range detecting device.

According to the presently disclosed subject matter, the AF frame can be automatically set to the range of the human face desired to be set as the tracking target only by the operation of the focus operating device by the cameraman, and the AF frame can be made to automatically track the tracking target subject (that is, the human face) by following the movement of the subject. Thereby, the complicated operation is made unnecessary at the time of starting the automatic tracking of the AF frame, and hence the cameraman's burden can be reduced.

DETAILED DESCRIPTION OF THE PREFERRED EMBODIMENTS

In the following, a preferred embodiment of an autofocus system according to the presently disclosed subject matter will be described with reference to the accompanying drawings.

Figure 1:
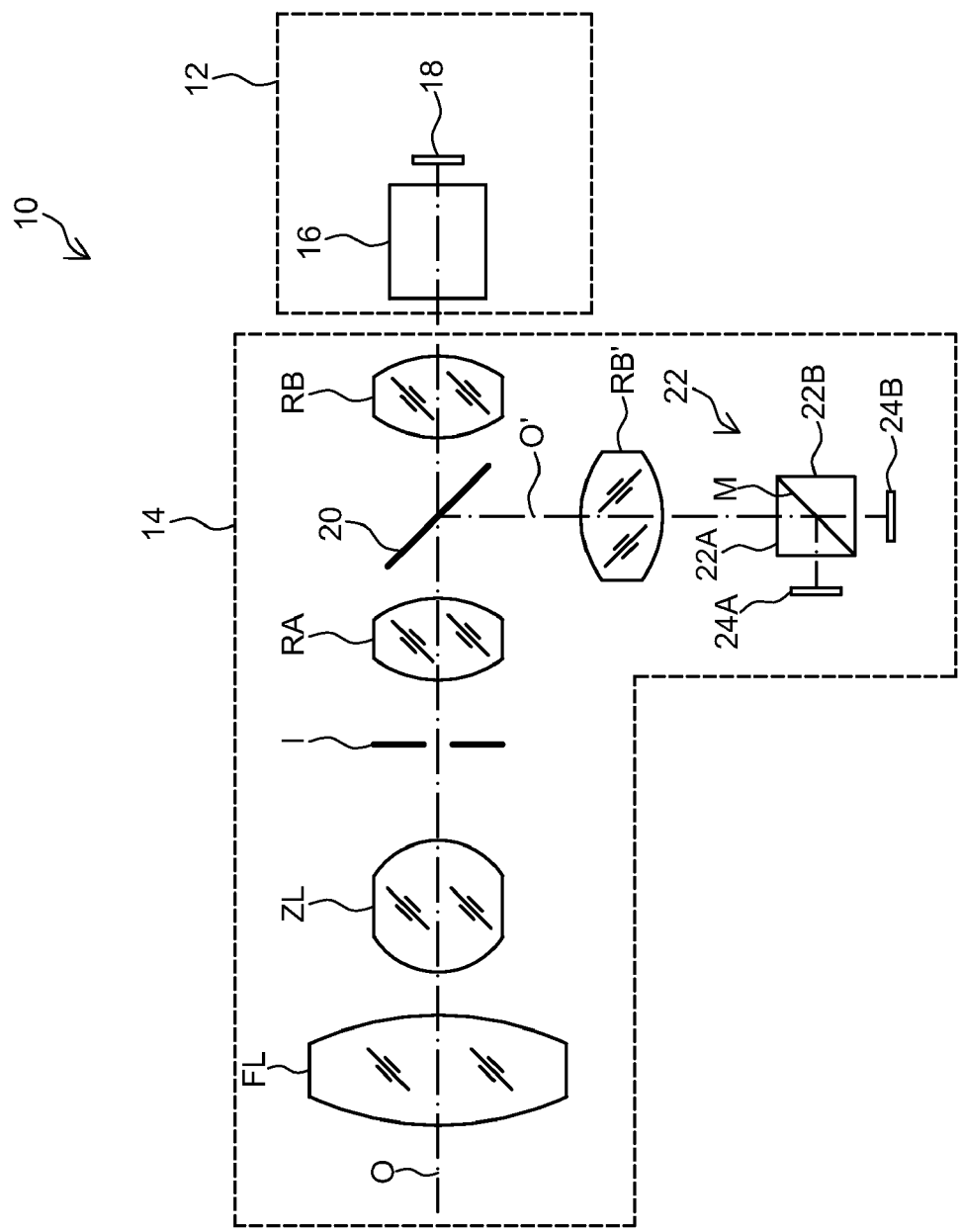
FIG. 1 is a figure showing a configuration of an optical system in a television camera system to which an autofocus system according to an embodiment of the presently disclosed subject matter is applied.

FIG. 1 is a figure showing a configuration of an optical system in a television camera system to which an autofocus system according to an embodiment of the presently disclosed subject matter is applied. A television camera system 10 shown in FIG. 1 is a system used for a broadcast television camera or a business-use television camera, and includes a camera main body 12 and a lens apparatus 14 which is attached to the camera main body 12.

In the lens apparatus 14, a focus lens (group) FL, a zoom lens (group) ZL, a diaphragm I, a relay lens (relay optical system) composed of a front side relay lens RA and a rear side relay lens RB, and the like, are arranged in order along the optical axis O of the main optical path from the preceding stage side. The focus lens FL and the zoom lens ZL are lens groups each of which can be moved back and forth along the optical axis O. When the focus lens FL is moved, the focus position (subject distance) is changed. When the zoom lens ZL is moved, the image magnification (focal distance) is changed. The diaphragm I is opened and closed. The lightness of an image is changed by adjusting the opening and closing degree (aperture amount) of the diaphragm I.

The subject light incident on the lens apparatus 14 enters the camera main body 12 through these lens groups. In the camera main body 12, a color separation optical system 16 for decomposing the subject light incident from the lens apparatus 14 into light of wavelengths of three colors of red (R), green (G), and blue (B), and an imaging element provided for each color of R, G and B and for imaging an image of the color-decomposed subject light of each color are arranged. Note that the imaging elements for R, G and B, each of which is arranged at the position corresponding to the equivalent optical path length, are represented by one imaging element for shooting 18 as shown in FIG. 1. The subject light incident on the imaging surface of the imaging element 18 is subjected to photoelectric conversion by the imaging element 18 for shooting to generate an image signal for recording or reproduction by a predetermined signal processing circuit in the camera main body 12.

Further, a view finder (not shown) is provided in the camera main body 12. An image imaged by the camera main body 12 is displayed in the view finder. Further, various kinds of information other than the shot image are displayed in the view finder. For example, an image (frame image) representing the range (position, size, shape) of the AF frame set at present is displayed by being superimposed on the shot image. The AF frame represents the range (contour) of a subject to be focused by autofocus (AF).

On the other hand, a half mirror 20 is arranged between the front side relay lens RA and the rear side relay lens RB of the relay optical system of the lens apparatus 14. By the half mirror 20, an optical path for AF is branched from the main optical path of the lens apparatus 14. The subject light incident on the lens apparatus 14 and passing through the half mirror 20 passes, as the subject light for the main optical path, through the main optical path of the optical axis O as it is, so as to be guided to the camera main body 12. The subject light reflected by the half mirror 20 is guided, as subject light for AF, to an optical path for AF which is provided along an optical axis O' substantially perpendicular to the optical axis O of the main optical path. Note that the subject light, which has, for example, about 50% of the light quantity of the subject light incident on the half mirror 20, passes through the half mirror 20. However, a half mirror having any transmitting and reflecting characteristics can be used as the half mirror 20.

In the optical path for AF, a relay lens RB' for AF equivalent to the rear side relay lens RB, a beam splitter (light dividing optical system) 22 composed of two prisms 22A and 22B, and imaging elements for AF 24A and 24B are arranged. The subject light, which is reflected by the half mirror 20 and guided to the optical path for AF, passes through the relay lens RB' for AF, and is then incident on the beam splitter 22. The subject light incident on the beam splitter 22 is divided into two equal quantities of subject light by the half mirror surface M at which the first prism 22A and the second prism 22B are joined to each other. The subject light reflected by the half mirror surface M is incident on the imaging surface of the one imaging element for AF 24A. The subject light passing through the half mirror surface M is incident on the imaging surface of the other imaging element for AF 24B.

Each of the imaging elements for AF 24A and 24B is an imaging element (solid-state imaging element, such as CCD (Charge Coupled Device)) provided exclusively for AF, and converts a subject image formed on the imaging surface by the subject light for AF into an electric signal, so as to output the electric signal as an image signal for AF.

Figure 2:
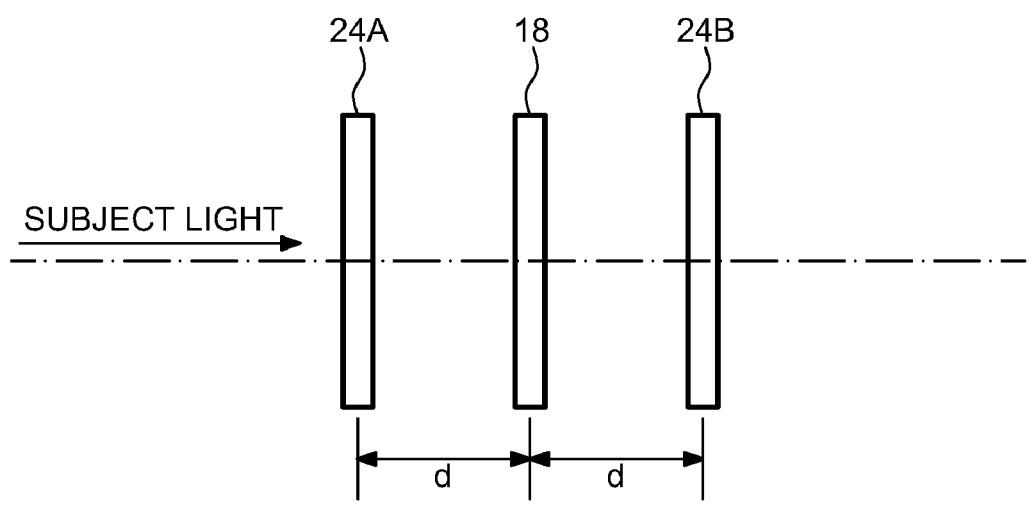
FIG. 2 is a figure for explaining an optical path length difference between imaging elements for AF.

FIG. 2 is a figure in which the imaging element for shooting 18 of the camera main body 12 and the imaging elements for AF 24A and 24B are illustrated on the same optical axis. As shown in the FIG. 2, the optical path length of the subject light incident on the one imaging element for AF 24A is set shorter than the optical path length of the subject light incident on the other imaging element for AF 24B. Further, the optical path length of the subject light incident on the imaging surface of the imaging element for shooting 18 is set to an intermediate length between the optical path lengths of the imaging elements for AF 24A and 24B. That is, (the imaging surfaces of) the pair of imaging elements for AF 24A and 24B are respectively placed (arranged) at positions separated from the imaging element for shooting 18 by the same distance d in the front and rear of the imaging surface of the imaging element for shooting 18.

With the pair of imaging elements for AF 24A and 24B arranged in the lens apparatus 14 in this way, it is possible to obtain image signals equivalent to image signals that are obtained in the case where the subject light incident on the lens apparatus 14 is imaged on the imaging surfaces respectively arranged at positions optically separated from the imaging element 18 for shooting by the same distance d, in the front and rear of the imaging surface of the imaging element 18 for shooting. Note that the imaging elements for AF 24A and 24B do not need to form color images. Thus, in the present embodiment, it is assumed that monochrome image signals (luminance signal) are respectively acquired from the imaging elements for AF 24A and 24B.

Figure 3:
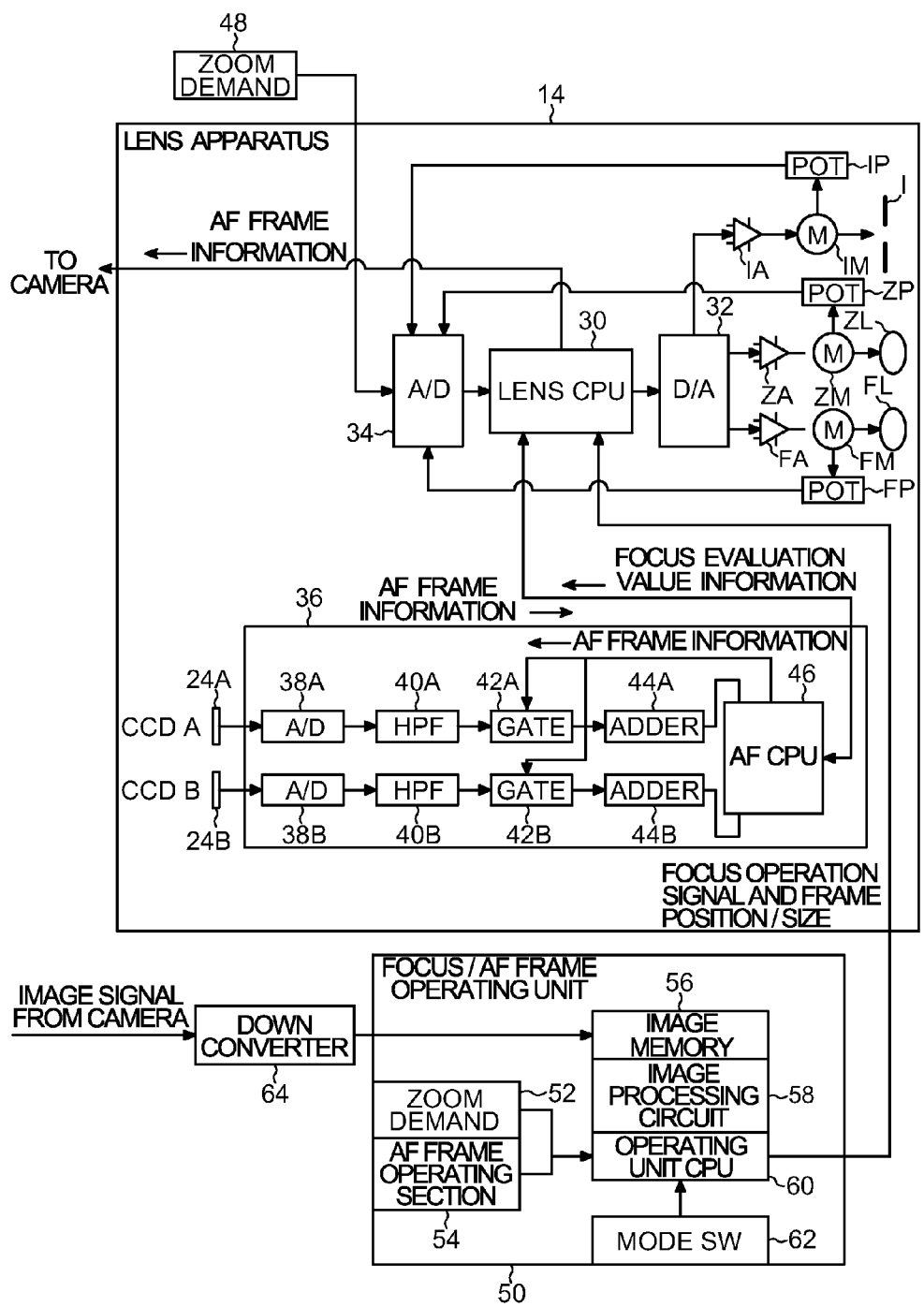
FIG. 3 is a block diagram showing a main configuration of a control system of a lens apparatus.

FIG. 3 is a block diagram showing a main configuration of a control system of a lens apparatus 14. As shown in the FIG. 3, the control system of the lens apparatus 14 is configured by mainly including a CPU (lens CPU) 30, amplifiers FA, ZA and IA, motors FM, ZM and IM, an operating unit (focus and AF frame operating unit) 50 having a focus demand 52 and an AF frame operating section 54, a zoom demand 48, and an AF processing section 36. Note that all or a part of the control system of the lens apparatus 14 may be configured as an apparatus separated from (the optical system of) the lens apparatus 14, or may be configured as one device as a whole together with (the optical system of) the lens apparatus 14. FIG. 3 shows, as an example, a configuration in which the operating unit 50 and the zoom demand 48 are separated from the lens apparatus 14.

The lens CPU 30 generally controls the entire lens apparatus 14 and outputs a drive signal to each of the amplifiers FA, ZA and IA via a D/A (Digital/Analog) converter 32. Each of the motors FM, ZM and IM is driven at a rotation speed corresponding to a value (voltage) of the drive signal given from the lens CPU 30 via the D/A converter 32 and each of the amplifiers FA, ZA and IA. The focus lens FL, the zoom lens ZL, and the diaphragm I are respectively connected with the motors FM, ZM and IM. Thus, the focus lens FL, the zoom lens ZL, and the diaphragm I are driven by the motors FM, ZM and IM, respectively.

Further, the output shafts of the motors FM, ZM and IM are respectively connected with potentiometers FP, ZP and IP, each of which outputs a voltage signal corresponding to a rotational position of each of the output shafts of the motors FM, ZM and IM. A voltage signal from each of the potentiometers FP, ZP and IP is given to the lens CPU 30 via an A/D converter 34. That is, the lens CPU 30 can acquire the information on the present position of each of the focus lens FL, the zoom lens ZL, and diaphragm I from the output signal of each of the potentiometers FP, ZP and IP. Thereby, the position or the operating speed of each of the focus lens FL, the zoom lens ZL, and the diaphragm I of the imaging lens is controlled to be in a desired state by the drive signal given to each of the amplifiers FA, ZA and IA from the lens CPU 30.

Each of the focus demand 52 and the zoom demand 48 has, as a controller of the lens apparatus 14, a manual operating member which is manually operated to specify a target position and a target moving speed of each of the focus (focus lens FL) and the zoom (zoom lens ZL) of the imaging lens. The focus demand 52 is incorporated in the operating unit 50 and is connected with the lens CPU 30 via a CPU (operating unit CPU) 60. The zoom demand 48 is connected with the lens CPU 30 via the A/D converter 34.

The control (focus control) of the focus lens FL can be switched between a control mode (MF mode) based on manual focus (MF) and a control mode (AF mode) based on autofocus (AF) by the operation of an AF switch (not shown). For example, a signal representing the turn on/off state of the AF switch is given to the lens CPU 30. Thus, the lens CPU 30 switches between the MF mode and the AF mode based on the state of the AF switch.

In the MF mode, when the focus demand 52 is manually operated by a cameraman, the lens CPU 30 controls the focus lens FL so that the focus lens FL is set to a target position (or target speed) indicated by the command signal given from the focus demand 52 via the CPU 60.

In the AF mode, on the basis of the information on the focus evaluation value (focus evaluation value information) in the AF frame acquired from the AF processing section 36 as will be described in detail below, the lens CPU 30 automatically controls the focus lens FL so that the focus is set to the subject in the AF frame. Note that even in the AF mode, when the manual focus (MF) operation (manual operation of the focus demand 52) is performed, priority may be given to the MF operation and the focus lens FL is controlled according to the MF operation.

In the control (zoom control) of the zoom lens ZL, when the zoom demand 48 is manually operated by the cameraman, the lens CPU 30 controls the zoom lens ZL so that the zoom lens ZL is set at a target speed (or target position) indicated by the command signal given from the zoom demand 48.

In the control (diaphragm control) of the diaphragm I, the lens CPU 30 controls the diaphragm I so that the diaphragm I is set to a set position (diaphragm value) indicated by the command signal given from the camera main body 12 (see FIG. 1).

Next, the control in the AF mode will be described. In the AF mode, on the basis of the focus evaluation value representing the level of the contrast of the subject image imaged (captured) by the imaging elements for AF 24A and 24B, the lens CPU 30 controls the focus lens FL so that the focus is set to the subject in the AF frame. Note that the focus evaluation value is calculated in the AF processing section 36.

In the pair of imaging elements for AF 24A and 24B, which are respectively arranged at positions optically separated from the imaging surface of the imaging element 18 for shooting by the same distance in the front and rear of the imaging surface of the imaging element 18 for shooting as shown in FIG. 2, the subject image formed by imaging the subject light passing through the optical path for AF on each of the imaging surfaces of the pair of imaging elements 24A and 24B is converted to an electric signal at a field period, so as to be outputted as an image signal. Then, the image signals are inputted into the AF processing section 36. Note that the image signal obtained from the imaging element for AF 24A is referred to as an image signal of chA, and the image signal obtained from the imaging element for AF 24B is referred to as an image signal of chB.

The AF processing section 36 is configured by including an A/D converter 38A, a high-pass filter (HPF) 40A, a gate circuit 42A, and an adding circuit 44A which are used for processing the image signal of chA. The AF processing section 36 is also configured by including an A/D converter 38B, a high-pass filter (HPF) 40B, a gate circuit 42B, and an adding circuit 44B which are used for processing the image signal of chB, and a CPU 46 for AF.

The image signal of chA inputted into the AF processing section 36 is first converted into a digital signal by the A/D converter 38A. Next, only the high frequency component signal of the image signal of chA is extracted by the HPF 40A. Then, the high frequency component image signal is inputted into the gate circuit 42A. In the gate circuit 42, only the image signal in the AF frame, which is included in the shooting range (screen) and specified by the CPU 46 for AF, is extracted from the high frequency component image signal. Then, the image signal in the AF frame extracted by the gate circuit 42A is inputted into the adding circuit 44A, and is integrated for each field (screen). Note that on the basis of the AF frame information given from the lens CPU 30, the CPU 46 for AF specifies the AF frame for the gate circuit 42A.

Further, the processing of the image signal of chB is also performed in each of circuits 38B to 44B similarly to the processing of the image signal of chA performed in each of the circuits 38A to 44A. Note that the explanation of the processing in each of the circuits 38B to 44B is omitted in order to avoid duplication.

The integrated value obtained in each of adding circuits 44A and 44B as described above is the focus evaluation value which represents the level of the contrast of the subject image imaged by each of the imaging elements for AF 24A and 24B. The focus evaluation values are read into the CPU 46 for AF. Note that the focus evaluation value obtained from the image signal of chA is referred to as a focus evaluation value of chA, and the focus evaluation value obtained from the image signal of chB is referred to as a focus evaluation value of chB.

The CPU 46 for AF of the AF processing section 36 can transmit and receive various data to and from the lens CPU 30, and transmits the information (focus evaluation value information), representing the focus evaluation values of chA and chB acquired as described above, to the lens CPU 30 according to a request from the lens CPU 30.

Then, on the basis of the focus evaluation values of chA and chB obtained from the AF processing section 36, the lens CPU 30 detects the focus state of the lens apparatus 14 with respect to the imaging element 18 for shooting.

Figure 4:
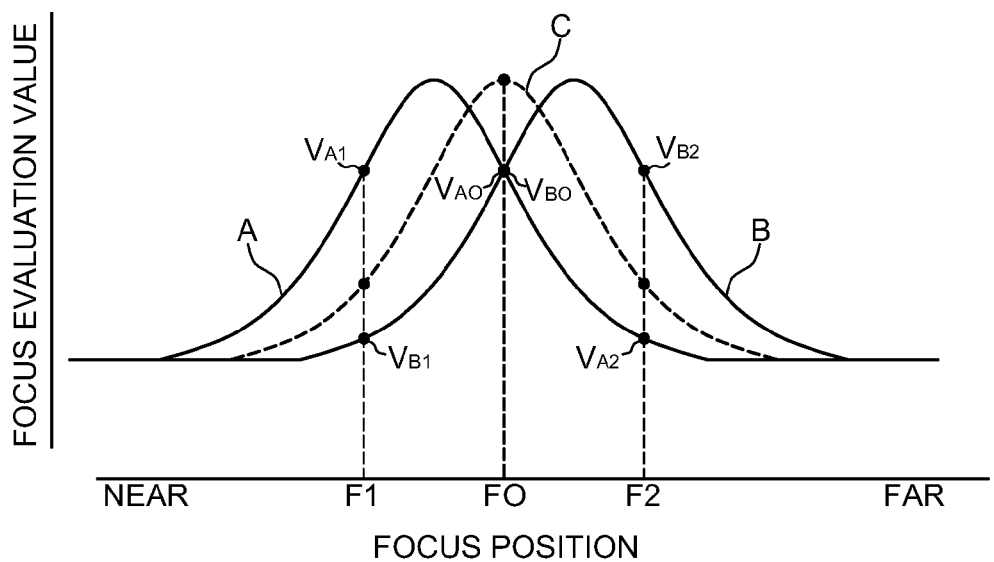
FIG. 4 is a figure showing an example of a relationship between the focus position and the focus evaluation value.

Here, the principle of the focus state detection performed by the lens CPU 30 will be described. FIG. 4 is a figure exemplifying a relationship between the focus position and the focus evaluation value at the time of imaging a subject. In FIG. 4, the position (focus position) of the focus lens FL (focus) of the lens apparatus 14 is taken along the abscissa, and the focus evaluation value is taken along the ordinate. The curves A and B shown by solid lines in the figure indicate, with respect to the focus position, the focus evaluation values of the chA and the chB respectively obtained from the image signals of chA and chB. On the other hand, the curve C shown by a dotted line in the figure indicates, with respect to the focus position, the focus evaluation value which is assumed to be obtained from the image signal obtained from the imaging element 18 for shooting.

In FIG. 4, the focus state of the lens apparatus 14 becomes the best focus (focusing) state at the time when the focus is set to the focus position F0 where the focus evaluation value of the imaging element 18 for shooting represented by the curve C becomes a maximum (local maximum). When the focus of the lens apparatus 14 is set to the focus position F1 located on the near side of the best focus position (focusing position) F0, the focus evaluation value of chA becomes the value $V_{A1}$ of the curve A corresponding to the focus position F1, and the focus evaluation value of chB becomes the value $V_{B1}$ of the curve B corresponding to the focus position F1. In this case, as can be seen from FIG. 4, the focus evaluation value $V_{A1}$ of chA becomes larger than the focus evaluation value $V_{B1}$ of chB. For this reason, it can be seen that, when the focus evaluation value $V_{A1}$ of chA is larger than the focus evaluation value $V_{B1}$ of chB, the focus is set on the near side of the focusing position F0, that is, is in the front focus state.

On the other hand, when the focus of the lens apparatus 14 is set to the focus position F2 located on the infinite distance side of the best focus position F0, the focus evaluation value of chA becomes the value $V_{A2}$ of the curve A corresponding to the focus position F2, and the focus evaluation value of chB becomes the value $V_{B2}$ of the curve B corresponding to focus position F2. In this case, the focus evaluation value $V_{A2}$ of chA becomes smaller than the focus evaluation value $V_{B2}$ of chB. For this reason, it can be seen that, when the focus evaluation value $V_{A2}$ of chA is smaller than the focus evaluation value $V_{B2}$ of chB, the focus is set on the infinite distance side (far side) of the focusing position F0, that is, is in the rear focus state.

On the other hand, when the focus of the lens apparatus 14 is set to the focus position F0, that is, the best focus position, the focus evaluation value of chA becomes the value $V_{A0}$ of the curve A corresponding to the focus position F0, and the focus evaluation value of chB becomes the value $V_{B0}$ of the curve B corresponding to the focus position F0. In this case, the focus evaluation value $V_{A0}$ of chA becomes equal to the focus evaluation value $V_{B0}$ of chB. For this reason, it can be understood that, when the focus evaluation value $V_{A0}$ of chA becomes equal to the focus evaluation value $V_{B0}$ of chB, the focus is set to the best focus position F0, that is, is in the best focus state.

The lens CPU 30 controls the focus lens FL, while detecting, based on the focus evaluation values of chA and chB obtained as described above, whether the present focus state of the lens apparatus 14 is in the front focus state, the rear focus state, or the best focus (focusing) state with respect to the imaging element 18 for shooting. For example, when the focus state detected from the focus evaluation values of chA and chB is the front focus state, the lens CPU 30 moves the focus lens FL in the far side direction. When the focus state detected from the focus evaluation values of chA and chB is the rear focus state, the lens CPU 30 moves the focus lens FL in the near side direction. Further, when the focus state detected from the focus evaluation values of chA and chB is the best focus (focusing) state, the lens CPU 30 stops the focus lens FL. Thereby, the focus lens FL is moved and stopped at the position where the focus state of the lens apparatus 14 becomes the best focus state. Note that the AF system, in which the focus of the lens apparatus 14 is controlled and set to a focused state based on the focus evaluation values of chA and chB in this way, is referred to as the optical path length difference system. Further, the detection (recognition) of the focus state is not necessarily required in the actual processing, and the moving direction of the focus lens FL for focusing can be detected from the focus evaluation values of chA and chB.

Further, in the present embodiment, as will be described below in detail, in the AF frame automatic setting mode, the lens CPU 30 can acquire, from the CPU 46 for AF, the range (region) which is in the best focus state in the shooting screen (photographed screen). Note that in this specification, the range, which is in the best focus state in the shooting screen, may be referred to as the "best focus position".

Figure 5:
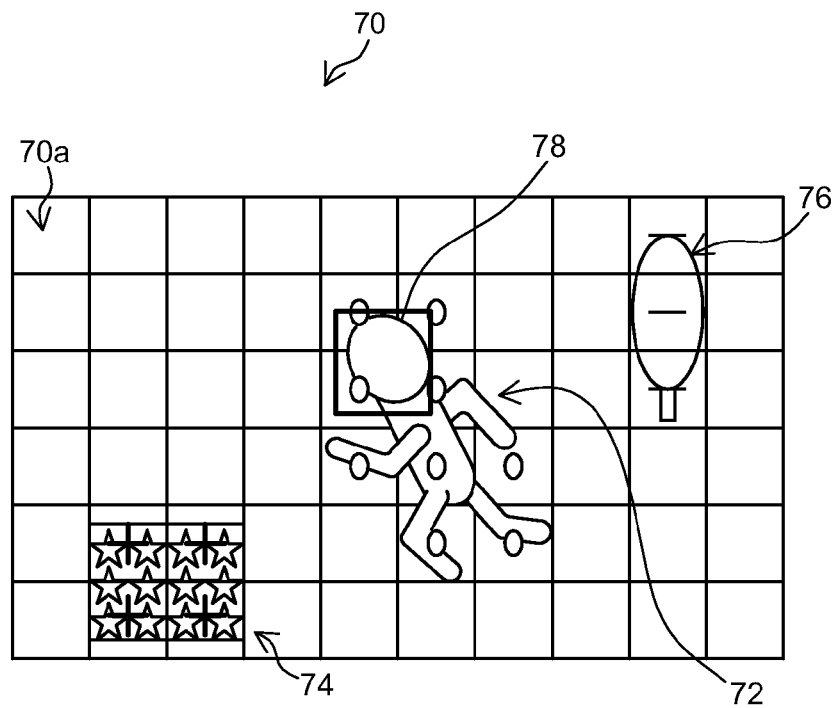
FIG. 5 is a figure showing an example of a shooting screen.

Here, the processing of the CPU 46 for AF at the time when the best focus position on the shooting screen is requested from the lens CPU 30 will be described. FIG. 5 is a figure showing an example of the shooting screen. In the figure, a region 70a including a subject (person) 72 in the best focus state is designated by the sign "0", a region 70a including a subject (except the person) 74 in the front focus state is designated by the sign "+", and a region 70a including a subject (except the person) 76 in the rear focus state is designated by the sign "−". Note that a region 70a which is not designated by any of the signs ("0", "+" and "−") is a defocused (blurring) region or a region in which no subject is included.

When a best focus position in the shooting screen 70 is requested from the lens CPU 30, the CPU 46 for AF divides the shooting screen 70 into a plurality of regions 70a as shown in FIG. 5, and calculates focus evaluation values of chA and chB for each of the regions 70a. The calculation method of the focus evaluation values of chA and chB for each of the regions 70a is performed similarly to the case where the focus evaluation value in the AF frame is calculated as described above, and hence explanation of the calculation method is omitted here in order to avoid duplication.

Further, the CPU 46 for AF calculates the focus evaluation values of chA and chB for each of the regions 70a, and detects the focus state (the best focus state, the front focus state, the rear focus state) of each of the regions 70a by comparing the differences between the focus evaluation values of chA and chB. Then, the CPU 46 for AF transmits, to the lens CPU 30, the regions 70a (designated by the sign "0" in FIG. 5) detected as the best focus position in the shooting screen 70.

In this way, the lens CPU 30 acquires, from the CPU 46 for AF, the best focus position (the range in the best focus state) in the shooting screen 70, and determines, as will be described below, whether or not a human face exists in the best focus position. When the human face exists in the best focus position, the lens CPU 30 sets an AF frame 78 to the face frame representing the range of the human face. Note that the detection of the human face included in the shooting screen 70 is performed by the operating unit 50.

Next, the operating unit (focus and AF frame operating unit) 50 will be described.

As shown in FIG. 3, the operating unit 50 includes the focus demand 52, the AF frame operating section 54, an image memory 56, an image processing circuit 58, the CPU 60, and a mode switch 62. For example, in the state where the operating unit 50 is housed in a case, the operating unit 50 is installed in a side of a lens barrel section of the lens apparatus 14, on an external wall surface of the case of the camera main body 12, or the like.

Note that the position at which the operating unit 50 is installed is not limited in particular. The operating unit 50 may be installed in any other positions and may be installed in a portion other than the lens apparatus 14 and the camera main body 12.

As described above, the focus demand 52 includes the operating member (focus operating member) for manually operating the focus lens FL. When the focus demand 52 is manually operated by the cameraman, the position (or moving speed) specified as the target by the focus demand 52 is read by the CPU 60. The command signal representing the specified position (or moving speed) is transmitted to the lens CPU 30 from the CPU 60. Then, the lens CPU 30 controls the focus lens FL based on the command signal given from the focus demand 52 via the CPU 60. Note that the focus demand 52 may be configured as an apparatus separated from the operating unit 50.

The AF frame operating section 54 is an operating section for mainly performing the operation about the control of the AF frame. The AF frame operating section 54 includes an operating member through which an operator manually inputs an instruction for specifying a range of an AF frame, and an operating member through which the operator performs the operation about the automatic tracking of the AF frame so as to make the AF frame automatically track a desired subject. Although not shown, the AF frame operating section 54 has a position operating member (for example, a joystick or a trackball) through which the operator manually moves a position of the AF frame vertically and horizontally, a size operating member (for example, a knob) through which the operator manually changes the size of the AF frame, a shape operating member (for example, a knob) through which the operator manually changes the shape of the AF frame, a tracking start switch for instructing the start of the automatic tracking of the AF frame, and a tracking stop switch for instructing the stop of the automatic tracking of the AF frame. The operation state of these operating members of the AF frame operating section 54 can be read (detected) by the CPU 60. Note that all or a part of the AF frame operating section 54 may be configured as an apparatus separated from the operating unit 50, so as to be connected with the operating unit 50 by a cable, wireless connection and the like.

The image signal inputted into the operating unit 50 from the camera main body 12 via a down converter 64 is once stored in the image memory 56. The image signal stored in the image memory 56 is converted by the image processing circuit 58 to data which can be digitally processed by the CPU 60. Thereby, the CPU 60 can acquire the image signal outputted from the image processing circuit 58 as a shot image of one frame unit. The image processing circuit 58 also has a memory, and the like, which can be read and write by the CPU 60 and which is suitably used to store processed data, and the like.

The CPU 60 has a function which, when the AF frame is set to a subject desired to be set as a tracking target, performs automatic tracking processing of the AF frame so as to make the AF frame track the movement of the subject. In the automatic tracking processing of the AF frame, the AF frame is first automatically or manually set to a subject desired to be set as the tracking target (AF frame setting processing). Then, an image of the subject set as the tracking target is detected by face detecting processing or pattern matching processing from shot images successively obtained from the image processing circuit 58, so that the range of the detected subject image is updated as the range of the AF frame (AF frame update processing). Note that the face detecting processing and the pattern matching processing, which are performed by the CPU 60, are known and hence the explanation thereof is omitted here.

The information (AF frame information) representing the range (position, size and shape) of the AF frame set or updated in this way is given to the lens CPU 30. The lens CPU 30 acquires the focus evaluation values of chA and chB in the AF frame from the CPU 46 for AF of the AF processing section 36, and controls the focus lens FL so that the focus is set to the subject in the AF frame.

The mode switch 62 is a selection switch (for example, a slide switch) for switching between the modes of the AF frame setting processing, that is, between an AF frame manual setting mode in which the AF frame can be manually set according to the operation of the AF frame operating section 54, and an AF frame automatic setting mode in which the AF frame can be automatically set only by the operation of the focus demand 52 without the operation of the AF frame operating section 54. The AF frame setting processing mode, which is selected by the mode switch 62, is read by the CPU 60 and transmitted to the lens CPU 30. Thereby, the lens CPU 30 can recognize the AF frame setting processing mode.

The AF frame manual setting mode is a mode in which, based on the operation of the AF frame operating section 54 by the operator (cameraman), the AF frame is manually set to a subject desired to be set as a tracking target in the shooting screen. The range (position, size, and the like) of the AF frame set by the AF frame operating section 54 is read by the CPU 60 and then transmitted to the lens CPU 30. The lens CPU 30 performs control of the focus lens FL based on the AF mode so that the focus is set to the subject in the AF frame. Further, the automatic tracking processing of the AF frame is also started or stopped by the operation of the AF frame operating section 54.

On the other hand, the AF frame automatic setting mode is a mode in which, when the cameraman operates the focus demand 52 so as to set the focus to a subject desired to be set as a tracking target in the shooting screen, the AF frame is automatically set to the subject existing in the range (best focus position) which is in the best focus state in the shooting screen.

In the AF frame automatic setting mode, the lens CPU 30 requests the CPU 60 of the operating unit 50 to detect a human face included in the shooting screen, and requests the CPU 46 for AF of the AF processing section 36 to detect the best focus position in the shooting screen.

According to the request from the lens CPU 30, the CPU 60 of the operating unit 50 performs the known face detection processing to the shot images successively obtained from the image processing circuit 58. When one or more human faces are detected in the shot image, the CPU 60 transmits the position and size of the frames (face frames) of all the detected faces to the lens CPU 30.

According to the request from the lens CPU 30, the CPU 46 for AF of the AF processing section 36 divides, as described above, the shooting screen into a plurality of regions and detects the focus state (the best focus state, the front focus state, the rear focus state) for each of the regions. Then, the CPU 46 for AF extracts the region (best focus position) which is in the best focus state in the shooting screen, and transmits the extracted region to the lens CPU 30.

In this way, the lens CPU 30 acquires the position and size of the face frame representing the range of the human face included in the shooting screen from the CPU 60 of the operating unit 50, and acquires the best focus position in the shooting screen from the CPU 46 for AF of the AF processing section 36. Then, the lens CPU 30 determines whether or not the human face exists in the best focus position in the shooting screen. When determining that the human face exists in the best focus position in the shooting screen, the lens CPU 30 automatically sets the AF frame to the face frame representing the range of the human face existing in the best focus position by setting the face frame as the tracking target.

Further, when a plurality of human faces are included in the best focus position, the lens CPU 30 automatically sets the AF frame to the face frame representing the range of one face among the plurality of human faces according to a predetermined priority order. As the priority order, it is possible to list various modes, such as a front-focus priority mode (or rear-focus priority mode), a screen-right-side priority mode (or screen-left-side priority mode), and a high-luminance priority mode (or low-luminance priority mode). Further, an embodiment equipped with a device which enables the priority order to be set according to the preference of the operator (for example, cameraman), is preferred and improves the convenience of the operator.

Further, when no human face exists in the best focus position, the lens CPU 30 automatically sets the AF frame to an object existing in the range which is in the best focus state. As a method for generating the AF frame at this time, it is possible to list, for example, a method for generating the AF frame on the basis of the range of the same color within the range which is in the best focus state.

The AF frame set in this way is transmitted from the lens CPU 30 to the camera main body 12, and is displayed on the display screen of the view finder installed in the camera main body 12 by being superimposed on the image imaged by the camera main body 12.

Figure 6:
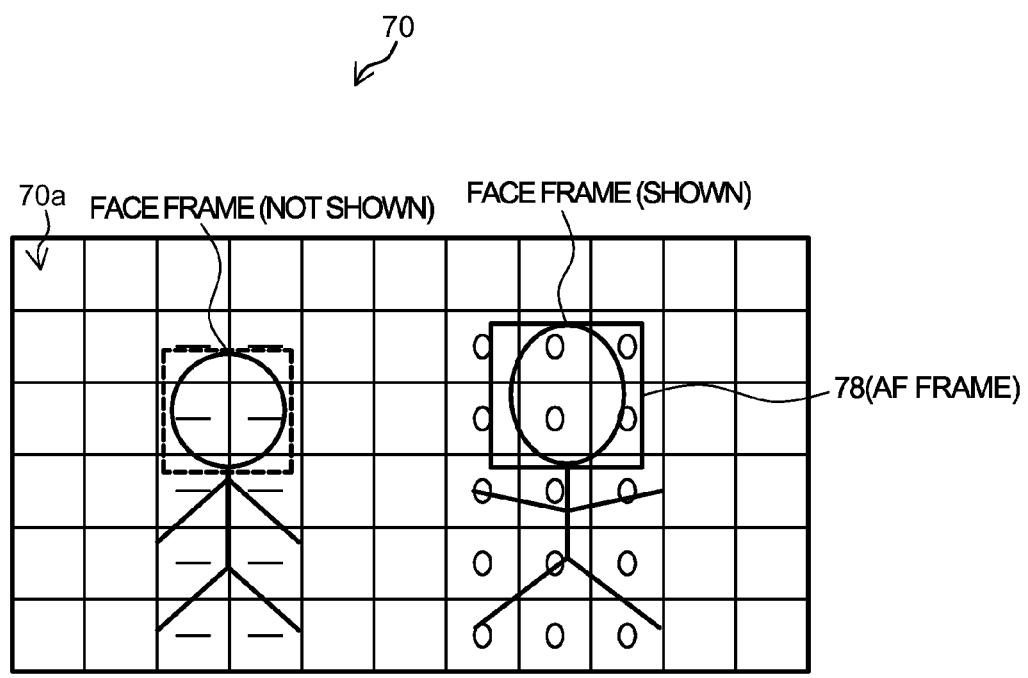
FIG. 6 is a figure showing an example of the case where a plurality of persons are included in a shooting screen.

Note that, in the present embodiment, for example, when a plurality of human faces are detected in the shooting screen 70 as shown in FIG. 6, the face frame is not displayed to all the human faces, but the face frame is displayed, as the AF frame 78, only on one face existing in the region 70a (region designated by the sign "0") which is set to the best focus position in the shooting screen 70 according to the operation of the focus demand 52.

Figure 7:
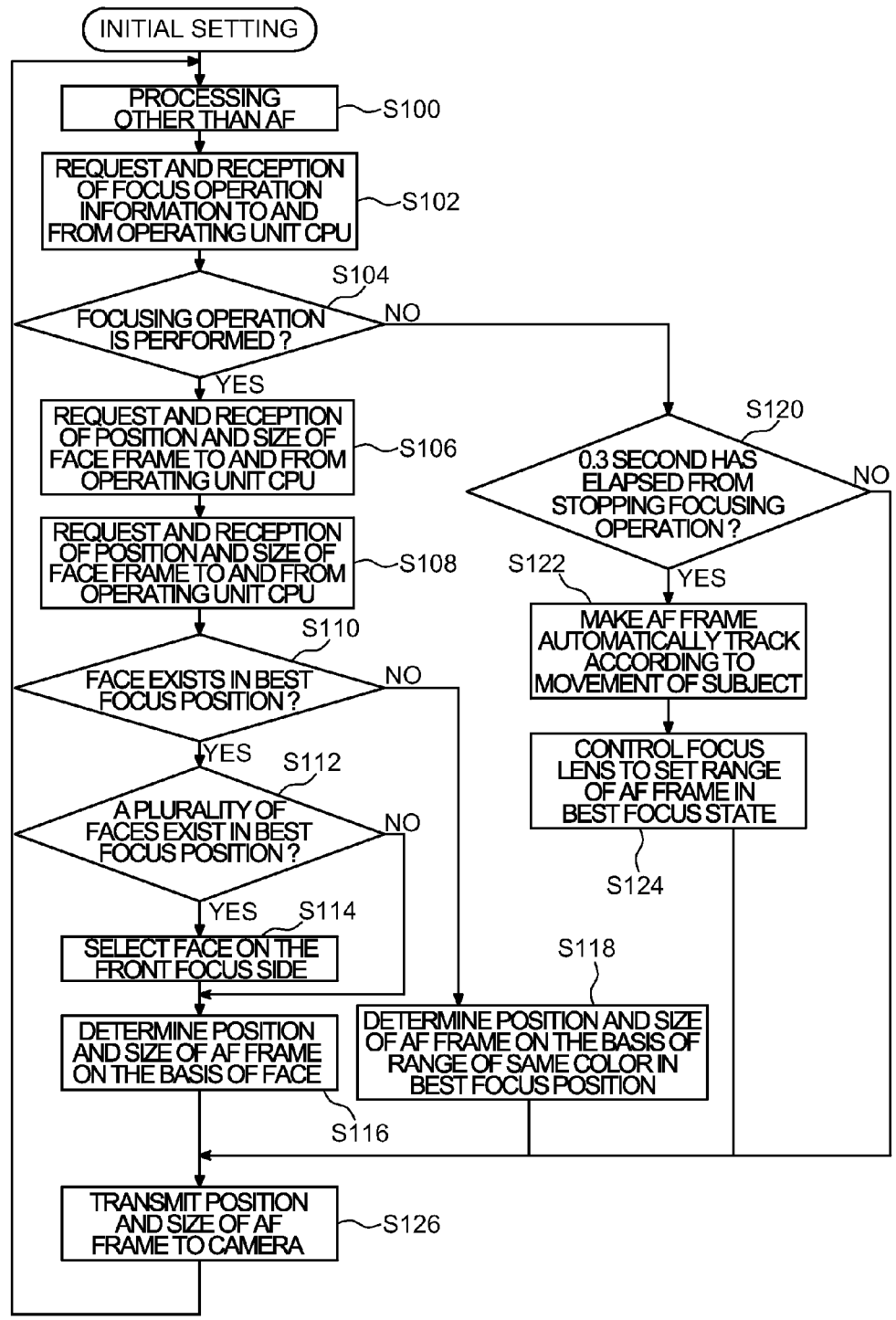
FIG. 7 is a flow chart showing a flow of processing performed by a lens CPU in an AF frame automatic setting mode.

Next, a flow of the processing in the AF frame automatic setting mode will be described with reference to FIG. 7. FIG. 7 is a flow chart showing a flow of the processing of the lens CPU 30 in the AF frame automatic setting mode.

As shown in FIG. 7, after performing a predetermined initial setting, the lens CPU 30 performs processing other than AF (step S100).

Next, the lens CPU 30 requests the CPU 60 of the operating unit 50 to send the information (focus operation information) representing whether or not the focus demand 52 is operated. Then, the lens CPU 30 receives the response to the request from the CPU 60 (step S102).

Next, based on the focus operation information acquired in previous step S102, the lens CPU 30 determines whether or not the focus demand 52 is operated (step S104). When the focus demand 52 is operated, the lens CPU 30 proceeds to step S106. When the focus demand 52 is not operated, the lens CPU 30 proceeds to step S120.

When the focus demand 52 is operated (in the case of Yes in step S104), the lens CPU 30 requests the best focus position on the shooting screen from the CPU 46 for AF of the AF processing section 36, and receives the response to the request from the CPU 46 for AF (step S106).

Next, the lens CPU 30 requests the position and size of the face frame representing the range of the human face (face image) on the shooting screen from the CPU 60 of the operating unit 50, and receives the response to the request from the CPU 60 (step S108). At this time, upon receipt of the request from the lens CPU 30, the CPU 60 detects the position and size of all the face frames included in the shooting screen by using the face detecting function provided in the CPU 60, and transmits the detection result to the lens CPU 30.

Next, the lens CPU 30 determines whether or not a human face exists in the best focus position on the shooting screen (step S110). When a human face exists in the best focus position, the lens CPU 30 proceeds to step S112. When no human face exists in the best focus position, the lens CPU 30 proceeds to step S118.

When a human face exists in the best focus position on the shooting screen (in the case of Yes in step S110), the lens CPU 30 determines whether or not a plurality of human faces exist in the best focus position (step S112).

When a plurality of human faces exist in the best focus position (in the case of Yes in step S112), the lens CPU 30 selects, as the setting target of the AF frame, a face on the front focus side from the plurality of human faces (step S114), and proceeds to step S116.

On the other hand, when a plurality of human faces do not exist in the best focus position (in the case of No in step S112), that is, when only one human face exists in the best focus position, the lens CPU 30 selects the face as the setting target of the AF frame and proceeds to step S116.

Next, the lens CPU 30 determines the position and size of the AF frame on the basis of the face selected as the setting target of the AF frame (step S116), and proceeds to step S126.

Further, when determining that no human face exists in the best focus position (in the case of No in step 110), the lens CPU 30 determines the position and size of the AF frame on the basis of a range of the same color in the range which is in the best focus state (step S118). Then, the lens CPU 30 proceeds to step S126.

Further, when the focus demand 52 is not operated (in the case of No in step S104), the lens CPU 30 determines whether or not a predetermined period of time (for example, 0.3 seconds) has elapsed from stopping the operation of the focus demand 52 (step S120).

When the predetermined period of time has elapsed from stopping the operation of the focus demand 52 (in the case of Yes in step S120), the lens CPU 30 determines that the setting processing of the AF frame by the operation of the focus demand 52 is ended, and makes the AF frame automatically track the subject according to the movement of the subject (step S122). Also, the lens CPU 30 controls the focus lens FL so that the range of the AF frame updated by the automatic tracking is in the best focus state (step S124). Then, the lens CPU 30 proceeds to step S126.

On the other hand, when the period of time elapsed after stopping the operation of the focus demand 52 is less than the predetermined period of time (for example, 0.3 second) (step S120), the lens CPU 30 determines that the setting processing of the AF frame by the operation of the focus demand 52 is continued. Thus, the lens CPU 30 skips processing of step S122 and step S124, and proceeds to step S126.

The lens CPU 30 transmits the position and size of the AF frame, which are set or updated in this way, to the camera main body 12 (step S126). Then, the lens CPU 30 returns to step S100 and repeats the processing from the beginning.

As described above, in the present embodiment, as fundamentally shown in the flow from step S100 to step S116, when a subject desired to be set as a tracking target is focused by the operation of the focus demand 52 by the cameraman (operator), the best focus position in the shooting screen is detected, and a human face in the shooting screen is detected. Then, when a human face exists in the best focus position in the shooting screen, the AF frame is automatically set to the face frame representing the range of the human face. Further, when a predetermined period of time (for example, 0.3 seconds) has elapsed after stopping the operation of the focus demand 52, the automatic tracking processing of the AF frame is performed by following the movement of the tracking target subject (that is, the human face) in the AF frame.

For example, in the case of the example shown in FIG. 5, the AF frame 78 is set, by the operation of the focus demand 52, to the face frame representing the range of the human face existing in the regions 70a (region designated by the sign "0") which is set to the best focus position in the shooting screen 70. Then, the automatic tracking processing of the AF frame is performed.

Further, in the case where a plurality of human faces (two human faces in this example) are included in the shooting screen 70 as in the example shown in FIG. 6, when the focus demand 52 is operated so that the region including the right side person is set to the best focus position, the AF frame 78 is set to the face frame representing the range of the face of the right side person existing in the best focus position among the plurality of human faces. Then, the automatic tracking processing of the AF frame is performed. Note that only the face frame of the right side person existing in the best focus position is displayed as the AF frame 78 in the shooting screen 70, and the face frame of the left side person existing in the region other than the best focus position is not displayed. Thus, the cameraman (operator) can instantaneously grasp the face frame to which the AF frame is set.

Further, when no human face is included in the best focus position in the shooting screen, the AF frame is automatically set to an object (other than a human face) existing in the best focus position. Then, the automatic tracking processing of the AF frame is performed.

Further, when the cameraman (operator) intends to operate the focus demand 52, the operation of the focus demand is preferentially performed. Thereby, when the automatically set position of the AF frame is not the position intended by the cameraman, or when the automatic tracking of the AF frame is not successfully performed, the AF frame can be immediately reset by the operation of the focus demand 52 performed again by the cameraman.

As described above, according to the present embodiment, the cameraman familiar to the operation of the focus demand 52 can easily set the AF frame only by operating the focus demand 52, without operating the operating apparatus, such as a joystick and a touch panel. Further, even when the automatic tracking of the AF frame is not successfully performed, the cameraman (operator) can immediately reset the AF frame by operating the focus demand 52. Thereby, the complicated operation at the time of starting the automatic tracking of the AF frame is made unnecessary, and hence the cameraman's burden can be reduced. Further, the operating apparatus, such as an expensive touch panel type monitor, is not needed for the system, and hence the cost of the system can be reduced.

In the above, an autofocus system according to the presently disclosed subject matter has been described. However, it is obvious that the presently disclosed subject matter is not limited to the above described embodiment, and various modifications and variations are possible within the scope and spirit of the presently disclosed subject matter.

What is claimed is:
1. An autofocus system comprising:
 a focus operating device which performs focusing in a shooting screen of a camera;

a best focus range detecting device which detects a range being in a best focus state from the shooting screen representing the result of the focusing performed by the focus operating device;

a face detecting device which detects a range including a human face from the shooting screen;

an AF frame automatic setting device which, when a human face exists in the range being in the best focus state in the shooting screen, automatically sets a position of an AF frame representing a range of an AF area that is a range to be focused by autofocus in the shooting screen, to a face frame representing the range of the human face; and an AF frame automatic tracking device which automatically tracks a subject in the AF frame set by the AF frame automatic setting device.

2. The autofocus system according to claim 1, wherein when a plurality of human faces exist in the range being in the best focus state in the shooting screen, the position of the AF frame is automatically set to the face frame representing the range of one human face selected from the plurality of human faces according to a predetermined priority order.

3. The autofocus system according to claim 1, wherein when no human face exists in the range being in the best focus state in the shooting screen, the position of the AF frame is automatically set to an object included in the range being in the best focus state.

4. The autofocus system according to claim 1, wherein the best focus range detecting device divides the shooting screen into a plurality of regions, and detects the range being in the best focus state by acquiring a focus state of each of the divided regions.

5. The autofocus system according to claim 4, wherein the focus state of each of the divided regions includes a best focus state, a front focus state, and a rear focus state.

6. The autofocus system according to claim 1, wherein the best focus range detecting device acquires the focus state based on a focus evaluation value of a subject image which is obtained based on an image signal obtained by imaging with an imaging element, subject light separated for the focus state detection from subject light incident on an imaging lens.

7. The autofocus system according to claim 1, wherein when the focus operating device is again operated after the AF frame automatic setting device automatically set the position of the AF frame, the best focus range detecting device again detects the range being in the best focus state in the shooting screen representing the result of the focusing performed by the focus operating device, and wherein the AF frame automatic setting device again sets the position of the AF frame based on the range being in the best focus state again detected by the best focus range detecting device.

* * * * *